March 29, 1966

S. L. PUCKETT ETAL 3,242,679

SOLAR REFRIGERATION UNIT

Filed April 7, 1964

Stanford Liberty Puckett
Lenwood H. McGraw
INVENTORS

BY *Clarence A. O'Brien*
and *Harvey B. Jacobson*
Attorneys

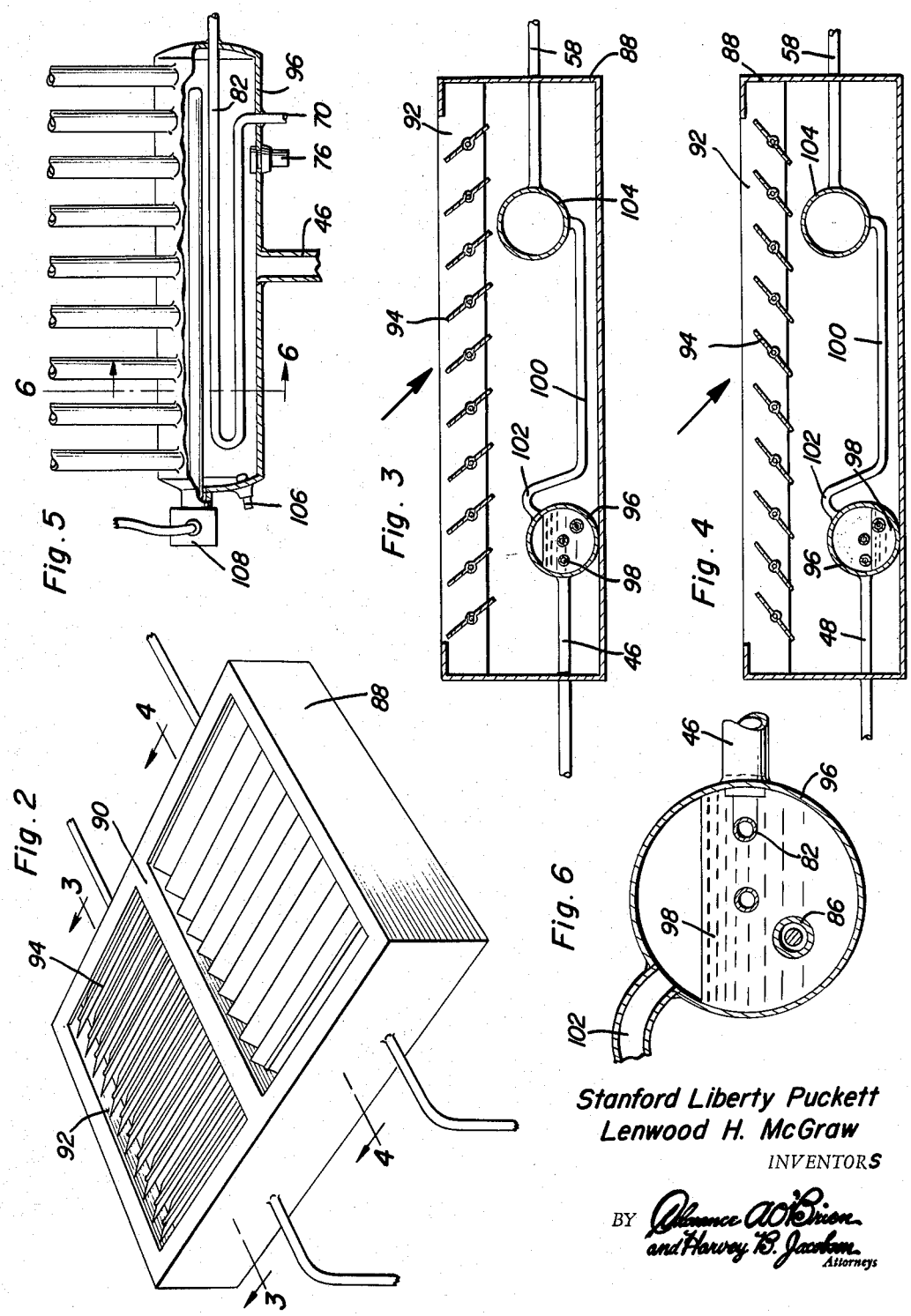

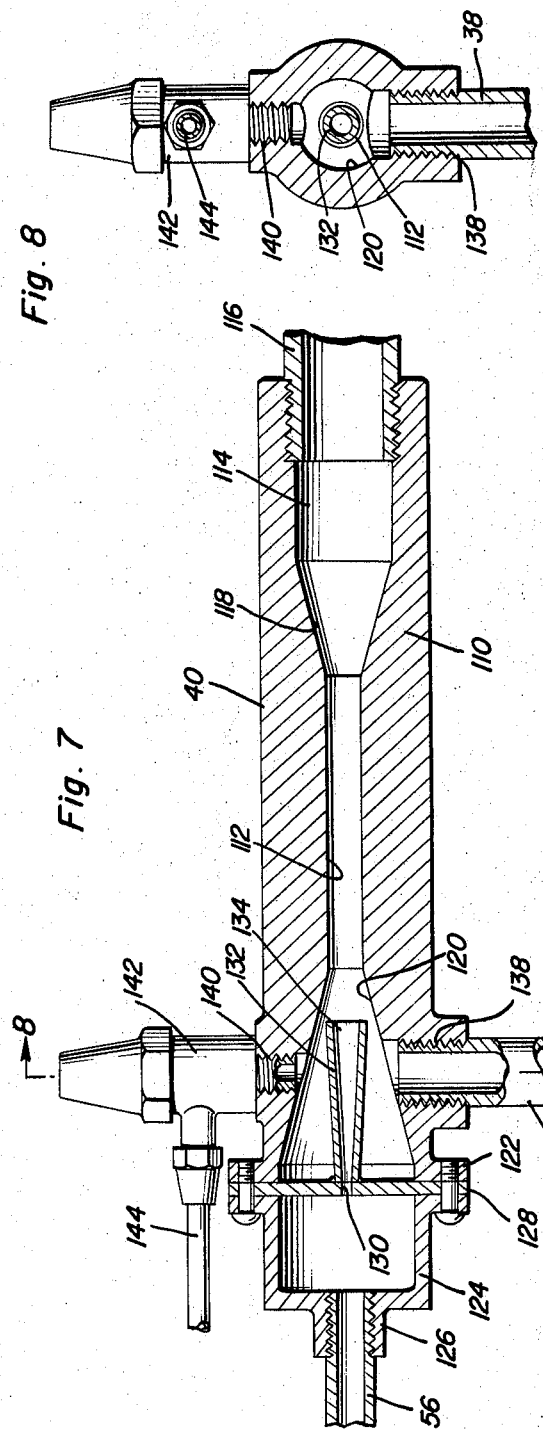
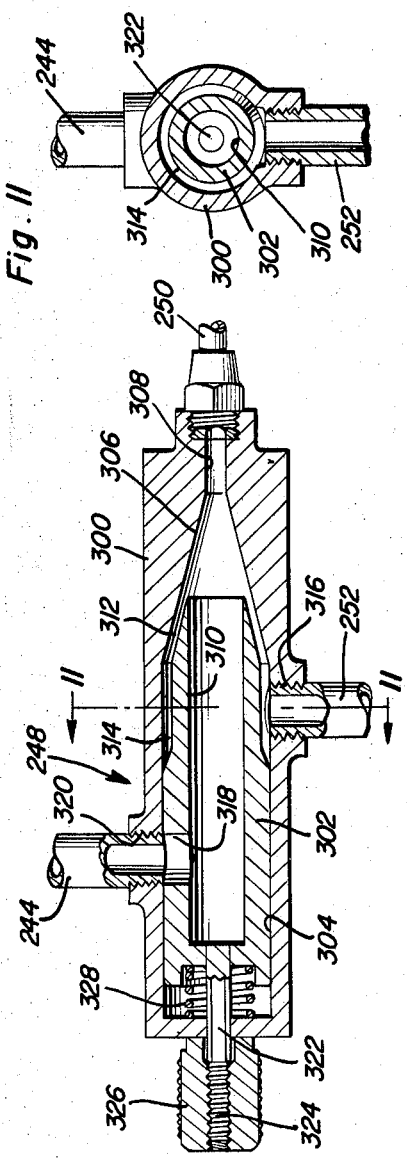

Stanford Liberty Puckett
Lenwood H. McGraw
INVENTORS

United States Patent Office 3,242,679
Patented Mar. 29, 1966

3,242,679
SOLAR REFRIGERATION UNIT
Stanford Liberty Puckett and Lenwood H. McGraw, Excelsior Springs, Mo., assignors of twelve and one-half percent each to Edward G. Fisher and Robert P. McGraw, both of Independence, Mo.
Filed Apr. 7, 1964, Ser. No. 357,994
9 Claims. (Cl. 62—2)

The present invention generally relates to refrigeration systems and more particularly to a solar refrigeration unit having various novel features incorporated therein which renders the refrigeration unit quite efficient and yet relatively low in initial cost as well as maintenance costs.

The present invention has for one of its objects the provision of a solar generator receiving its energy from the sun in which the solar generator may be either of the direct or indirect type.

Another object of the present invention is to provide a refrigeration system of the type having a solar generator which also is provided with a heat supply mechanism employed as an auxiliary to the solar generator for enabling operation of the refrigeration system during periods when the solar energy is insufficient to supply the requisite amount of heat required for the operation of the refrigeration unit.

Another very important object of the present invention is to provide a refrigeration unit having a novel gas expansion valve including a nozzle where the expanding gas is discharged at a relatively high velocity so that refrigerant vapor will be entrained therein.

Another object of the present invention is to provide a refrigeration unit including a solar generator having louvers therein which may be adjusted to enable the sun's rays to engage the generator.

A further important object of the present invention is to provide a refrigeration system including two solar generators with one being on a refill cycle while the other is on a discharge cycle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of the solar generator illustrating the orientation of the louvers of the two solar generators with the louvers on one being closed while on the refill cycle and the louvers on the other being open on the refrigerating or discharge cycle;

FIGURE 3 is a sectional view taken substantially upon a plane passing along section line 3—3 of FIGURE 2 illustrating the orientation of the louvers which are opening for enabling the sun to heat the solar generator;

FIGURE 4 is a detail sectional view taken substantially upon a plane passing along section line 4—4 of FIGURE 2 illustrating the orientation of the louvers when they are in closed position insofar as the sun is concerned so that the generating unit having the louvers closed may be on the refill cycle;

FIGURE 5 is a detail sectional view of a portion of the solar generator illustrating the interior construction thereof;

FIGURE 6 is a transverse, sectional view taken substantially upon a plane passing along section line 6—6 of FIGURE 5 illustrating further structural details of the solar unit;

FIGURE 7 is a detail sectional view of the gas ejector valve employed in the refrigeration system;

FIGURE 8 is a transverse, sectional view taken substantially upon a plane passing along section line 8—8 of FIGURE 7 illustrating further structural details of the gas ejector valve;

FIGURE 10 is a detail sectional view of a high pressure ejector valve employed in the indirect type of solar generator refrigerating unit; and FIGURE 11 is a transverse, sectional view taken generally upon section line 11—11 of FIGURE 10.

Figure 1:
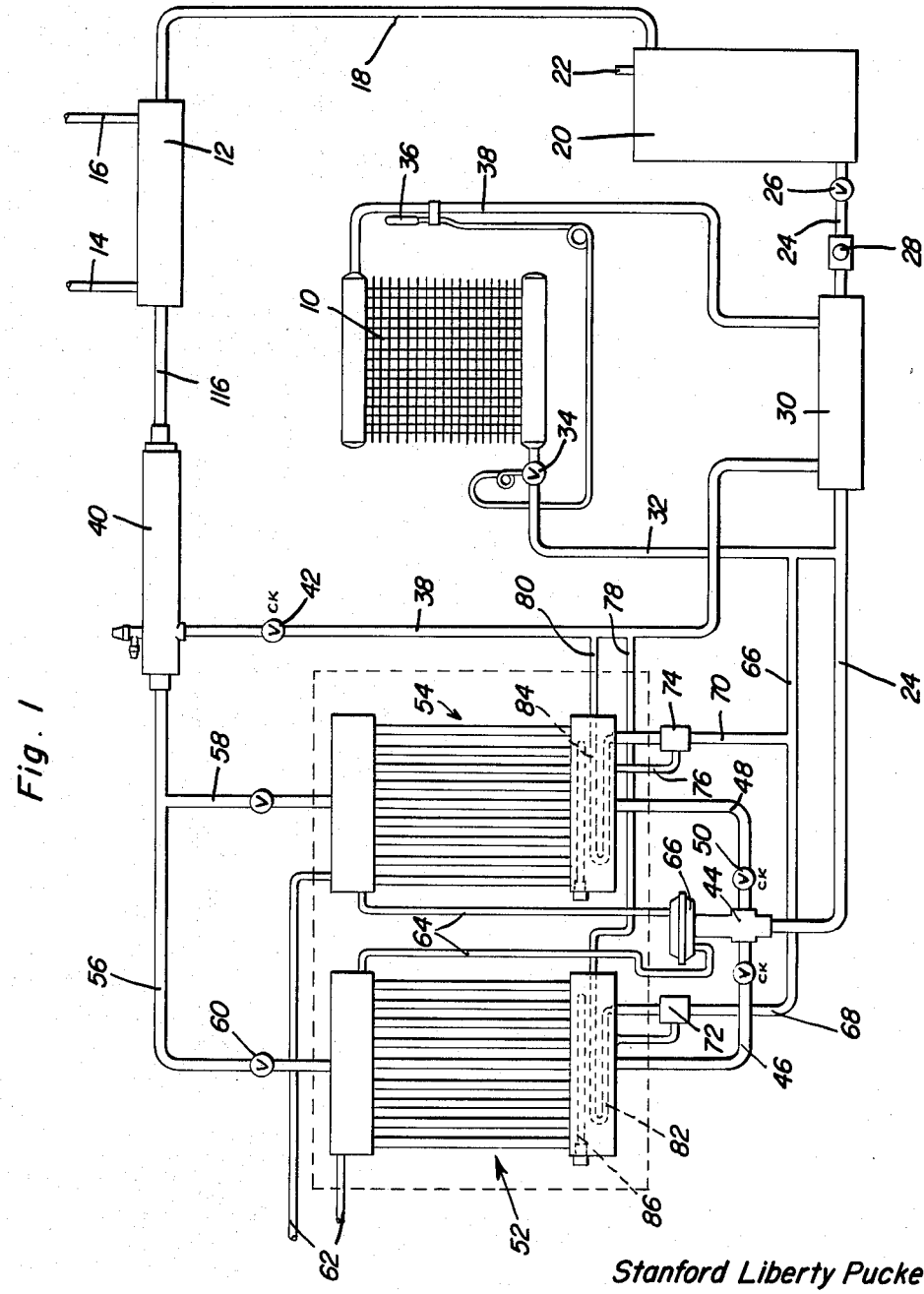
FIGURE 1 is a schematic plan view of the refiregation unit of the present invention illustrating the direct type of solar generator.

Referring now specifically to FIGURE 1 of the drawings, certain components of the refrigeration system are more or less conventional such as the evaporator 10 which may be of any suitable construction depending upon the intended use of the refrigeration unit. For example, the evaporator may be of the finned tube type where air is to pass therethrough and suitable fan means may be provided for inducing flow of air through or over the evaporator. A condenser 12 is provided for cooling the hot gas refrigerant and the condenser 12 may conveniently be water cooled through a condenser water supply pipe 14 and the cooling water may be discharged from a condenser water discharge pipe 16. The condenser 12 is provided with a discharge line 18 which is a condenser liquid line extending into the top of a receiver tank 20 which has a high pressure safety valve 22 incorporated therein and a liquid refrigerant line 24 extending laterally outwardly from the bottom thereof with there being a receiver tank cut-off valve 26 in the line 24 and a liquid sight glass 28 may also be provided in the liquid line 24 downstream from the valve 26 and the line 24 passes through a heat exchanger 30 which raises the gas temperature and pre-cools the water for a purpose set forth hereinafter. Extending from the liquid line 24 is a liquid evaporator line 32 which extends into the bottom of the evaporator coil unit 10. A refrigeration expansion valve 34 is provided in the liquid refrigerant line leading to the evaporator and the expansion valve 34 is controlled by a heat bulb 36 in heat exchange relation to an evaporator suction line 38 which is actually the discharge line from the evaporator for controlling the inflow of liquid refrigerant into the evaporator for expansion purposes and cooling purposes in response to the temperature of the discharge from the evaporator. The suction line 38 extends into the heat exchanger 30 at the other end thereof the evaporator suction line 38 extends into communication with a gas ejector valve 40 with there being provided a check valve 42 therein to insure flow only in the direction of the ejector valve 40.

The liquid line 24 extends into a juncture 44 forming part of a high pressure 3-way control valve and is communicated with a pair of branch pipes 46 and 48 and each branch pipe is provided with a check valve 50 to prevent reverse flow therein. The branch pipe 46 enters a solar generator unit generally designated by numeral 52 while the branch conduit 48 enters a solar generator 54. The opposite end of the solar unit 52 is connected to the ejector valve 40 by a conduit 56 and a conduit 58 also is provided for connecting the generator 54 to the ejector valve 40 and a regulating valve 60 is provided in each of the conduits 56 and 58 for regulating the pressure discharge from the solar generator units 52 and 54.

Extending from each of the generators 52 and 54 is a pressure line 62 which extends to a louver control structure and also extending from the same end of each generator 52 and 54 is a pressure line 64 which extends to and controls a pressure operated three-way high pressure liquid control valve 66.

Extending from the evaporator liquid line 32 is a branch line 67 communicating with inlet lines 68 and 70 extending to the generator refill cooling coil. The line 68 is provided with a pressure operated expansion valve 72 and the line 70 is also provided with a pressure operated expansion valve 74 controlled by pressure line, in each instance, 76 communicated with the generator 52 or 54. Extending from the evaporator discharge line 38 is a pair of discharge lines 78 and 80 communicated with the cooling coils 82 and 84 respectively in the generators 52 and 54. The inlet of the coil 82 is communicated with the conduit 68 through the expansion valve 72 and the cooling coil 84 is communicated with the conduit 70 through the expansion valve 72. Also disposed in each generator is an electrical heating element 86 for boosting the heat in the generator when desired.

FIGURES 2–6 illustrate the particular construction of the generators including a hollow shell 88 having a partition 90 with the outer edges of the shell and the partition 90 having depending flanges 92 pivotally mounting louvers 94 therein. The louvers are pivoted as a group with the louvers 94 being closed when the unit is in the refill cycle and being open when the unit is in the refrigerating cycle. FIGURE 3 illustrates the louvers in open position and FIGURE 4 illustrates the louvers in closed position and any suitable pressure operating control mechanism connected with the lines 62 may be provided for operating the louvers between their open and closed positions. FIGURES 3 and 4 illustrate the construction of the generators as including generally cylindrical generator manifold 96 having the inlet conduit 46 or 48 communicated therewith centrally at one side with refrigerant 98 substantially filling the manifold. Extending from the upper side of the generator manifold 96 is a plurality of tubes 100 each having an upwardly extending and then downwardly offset portion 102 as illustrated in FIGURES 3 and 4. Communicating with the other ends of the tubes 100 is a discharge manifold 104 having the exit lines 56 and 58 communicated therewith respectively.

FIGURES 5 and 6 illustrate the orientation of the cooling coil 82 or 84 within the inlet manifold 96 and also illustrates the orientation of the electrical heating element 86 therein as well as the orientation of the inlet line 46 or 48 or the outlet tubes 102. FIGURE 5 illustrates the manner in which the cooling coil 82 is connected to the branch pipe 70 and the pressure control line 76 is also connected with the manifold for operating the pressure operated expansion valve 74. A clean-out plug 106 is provided for the manifold 96 and also the manifold 104 if desired and a suitable electrical box or junction means 108 is provided for the immersion heater element 86.

FIGURES 7 and 8 illustrate the specific details of construction of the ejector valve 40 which includes an elongated body 110 having a longitudinal passage 112 therein in the form of a diffuser throat. At the discharge end of the throat 112 there is a gas discharge area 114 of greater cross-sectional area than the throat 112 and the discharge area 114 is connected with a pipe 116 forming an inlet into the condenser 220. Interposed between the throat 112 and the gas discharge area 114 is a generally conical diffuser area 118 and at the inlet of the diffuser throat 112, there is a similar conical area 120. A flange 122 is integral with the inlet end of the body 110 and attached to the flange 122 is an inlet bonnet 124 which may may be hat-shaped and provided with an adapter 126 connected with the inlet line 56. Interposed between the bonnet 124 and the flange 122 is a nozzle plate and holder 128 having an orifice 130 centrally disposed therein and the plate 128 also supports a gas nozzle 132 which has a discharge end 134 of larger cross-sectional area than the orifice 130 and the discharge end 134 is located in the isentropic gas area 120 as illustrated in FIGURE 7.

The body 110 is provided with an inlet opening 138 having the line 38 connected thereto with the inlet opening being disposed upstream of the discharge area 134 of the nozzle 132. Disposed opposite to the inlet 138, there is provided a port 140 having a gauge valve 142 communicated therewith and a gauge line 144 extending to a suitable pressure gauge.

Referring now to the drawings, the generator 52 on the discharge cycle is filled with high pressure liquid refrigerant such as "Freon 12" and since the louvers 94 are open as illustrated in FIGURE 3, the refrigerant will be heated and discharge hot gas through the pressure regulator 60 in the line 56. Hot gas then passes into the gas jet ejector valve 40, through the bonnet 124, and through the orifice 130 and nozzle 132. As the hot gases pass through the nozzle and into the diffuser throat 112 at its kinetic energy induced high velocity, it entrains cold gas through suction line 38 which is drawn in by the resultant suction induced by the venturi action. Thus, liquid refrigerant is being sucked through the evaporator 10 as it enters through the expansion valve 34 from line 32 connected with the liquid refrigerant receiver 20. The hot gas now flows through the water cooled condenser 12 as it is discharged from the ejector valve 40 and passes to the receiver 20 through the condenser liquid refrigerant line 18.

As the generator 52 expands its charge of gas, the pressure therein will drop. When this happens, the three-way pressure operated valve 66 actuates through the pressure line 64 extending from the generator 52 and closes the branch line 46 thus closing the generator 52. Simultaneously, the louvers 94 over the generator 52 which were previously in an open condition are closed due to the pressure line 62 causing the pressure operated control to operate. Also, the louvers 94 on the generator 54 will be simultaneously opened which occurs because the control has been filling with the expanded gas from the generator 52. As this happens, due to the exposure of the generator tubes on generator 54, its pressure rises rapidly and generator 54 takes over the cycle of refrigeration just as generator 52 had functioned. Thus, the cycle continues alternately since generator 52 is on the refill cycle while the generator 54 is on the refrigeration cycle.

The refrigerant coming into the generator 52 during its refill cycle is cooled by the cooling coil 82 which is controlled by the expansion valve 72. This cooling operation by the cooling coil 82 as the refrigerant enters the generator 52 on the refill cycle assures a full charge of gas. The gas from the cooling coil 82 exits to the suction line 38 and this cycle continues alternately while the system is demanding refrigerant. The immersion heater 86 is thermostatically controlled in the control box therefor in order to actuate the system for a start or while the sun is occluded or not sufficient for solar operation. Where electrical energy is not available, a thermostatically operated gas pilot igniting gas burner may be utilized for generator operation, or in geograghic locations where the sun is not sufficient for sustained periods, for night operation, or during winter months. A natural or manufactured gas system, or any other available heat source could be utilized for prime generator operation.

Figure 9:
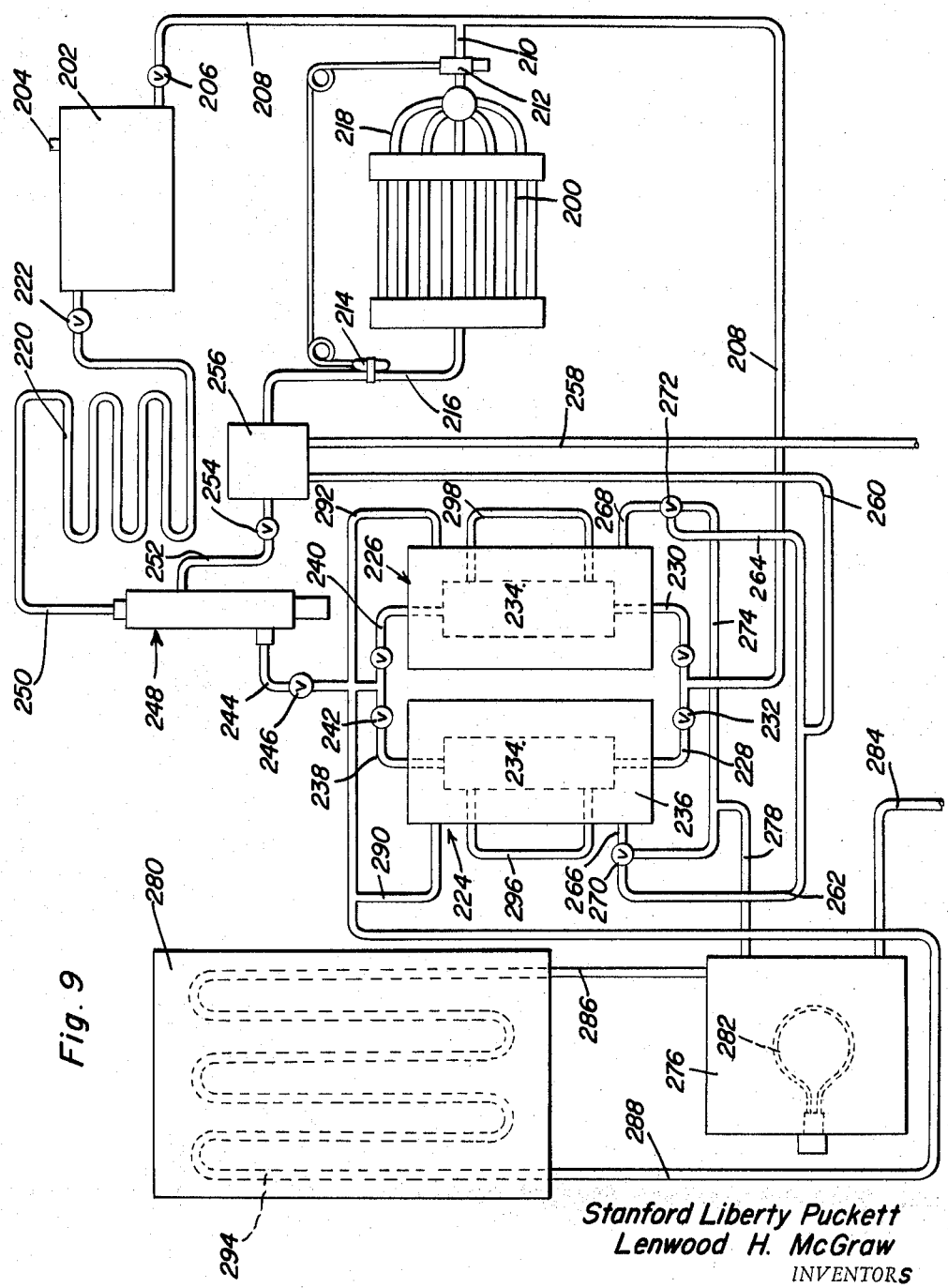
FIGURE 9 is a schematic plan view of the refrigeration system using the indirect type of solar unit.

FIGURE 9 illustrates schematically a refrigeration system employing an indirect solar generator system which includes an evaporator 200, a receiver 202 having a safety valve 204 thereon and a receiver cut-off valve 206 in a liquid line 208 extending down to a branch line 210 communicating with an expansion 212 controlled by a heat bulb 214 attached to the discharge line 216 from the evaporator 200 for operation in a conventional manner. The refrigerant is discharged into the evaporator through a plurality of branch lines 218. A condenser 220 is provided on the inlet side of the receiver and a cutoff valve 222 is provided therebetween. In this orientation, an air cooled condenser has been illustrated and 226 are provided and a liquid refrigerant line 208 extends the evaporator may be of the liquid immersion type.

In this form of the invention, two generators 224 and into and is communicated with branch conduits 228 and 230 extending into the generators 224 and 226 respectively. Each of the conduits 228 and 230 is provided with a pressure operated inlet valve 232 for controlling inflow of gas into the generator unit. The generator units 224 and 226 each includes a central manifold 234 surrounded by a water jacket 234 with the inlet lines 228 and 230 extending into one end of the tank or manifold 234 and outlet lines 238 and 240 extending outwardly from the other end of the manifolds or tanks 230. A check valve 242 is disposed in each outlet line 238 and 240 and the outlet lines 238 and 240 are connected to a single conduit or pipe 244 having a pressure regulating valve 246 therein. The conduit 244 extends into a high pressure injector 248. The discharge of the injector is in the form of a conduit 250 forming an inlet for the condenser 220. Extending into the injector 248 is a branch conduit 252 having a check valve 254 therein communicated with the discharge from the evaporator 216 with the discharge line 216 extending through a heat exchanger 256 which receives water from an inlet line 258 connected with a domestic cold water source or the condensing water if a water condenser is used so that the water will be cooled as it goes through the heat exchanger 256 thus increasing the temperature of the gas being discharged from the evaporator. The cooled water is discharged into a water line 260 extending from the heat exchanger that in turn is communicated with branch lines 262 and 264 which joins to water inlet lines 266 and 268 respectively through pressure operated water inlet valves 270 and 272. Also connected with the water inlet lines 266 and 268 is a hot water inlet pipe 274 which also connects with the valves 270 and 272 thereby enabling selectively hot or cold water to be introduced into the water jackets 236 of the generators 224 and 226. The hot water inlet pipe 274 is connected to a hot water heater 276 by a connecting line 278. The hot water heater 276 receives its hot water from a solar heating unit 280 or from an electric booster unit 282 and is supplied with water by a water supply line 284 connected with any suitable source of supply. The solar heating unit 280 is connected with the heater tank 276 by a connecting conduit 286 and the solar unit is connected to the discharge end of the water jackets 236 by a connecting line 288 which is provided with branches 290 and 292 which communicate with the discharge ends of the water jackets 236 on the generators 224 and 226. Thus, water is discharged from the heater 276 through the conduit 278 into the conduit 274 and thence into the jackets 236 depending upon the positioning of the valves 270 and 272. The solar heating unit is provided with a plurality of coils 294 of any suitable construction wherein the sun's rays heat the water in the coil and is discharged into the tank 276 and a thermostatic control may be provided therefor so that the electric booster may maintain a proper temperature therein. Liquid sight gauges 296 and 298 are provided in the generator manifolds 234 for indicating the flow of refrigerant therethrough.

FIGURES 10 and 11 illustrate the details of the high pressure injector 248 which includes a longitudinally elongated body 300, a longitudinally adjustable jet or nozzle 302 disposed in a longitudinal bore 304 in the body 300. The end of the bore 300 is tapered into a conical configuration at 306 for communication with a discharge passage 308 communicated with the conduit 250. The jet 302 is provided with a hollow interior 310 and a tapered end portion 312 generally conforming to the taper of the portion 306 of the bore and the jet or nozzle 302 is also provided with a reduced cylindrical area 314 spaced concentrically in relation to the bore 304 with the reduced area 314 being communicated with an inlet port 316 communicated with the inlet line 252 from the evaporator 200.

The jet 302 has an opening 318 therein communicating the interior bore 310 thereof with an inlet port 320 communicated with the inlet line 244 which communicates with the discharge side of the generators 224 and 226. The longitudinal position of the jet 302 is adjusted by virtue of a shank 322 extending outwardly from the end of the body 300 opposite to the discharge passageway 308. The shank 322 has a threaded portion 324 threadedly engaged with a knurled nut 326 whereby rotation of the nut 326 will effect longitudinal movement of the jet 302. A compression spring 328 is disposed between the jet 302 and the end of the body 300 for enabling adjustment of the jet 302 by tightening or loosening the nut 326 on the threaded shank 322.

In operation of the indirect system, the generator 224 is charged with high pressure liquid such as "Freon 12" that is under heat provided by the solar hot water system including the solar heater 280 having a temperature of 140° F. in the water jacket around the gas generator. Subjecting the liquid refrigerant to such a temperature produces a pressure which is discharged through the line 238, through the pressure regulating valve 246 into the line 244 and into the injector 248. As the constant pressure refrigerant passes through the pressure injector valve 248, its shock pressure reaction effects a vacuum at port 316 to which is connected the suction side of the evaporator thus pulling a back pressure on the evaporator 200. As the high pressure gas leaves the injector valve 248, it enters the condenser and from there into the receiver. After the generator 224 has exhausted its charge of gas, the pressure naturally drops. When this happens, pressure valve 232 in conduit 228 which has been closed while generator 224 was filling with gas under the pressure in the receiver since generator 226 was being cooled by cold water entering through the two way pressure operated valve 272. When the pressure in the generator 224 has dropped to the actuating pressure of the pressure operated valve 232, and the conduit 230, it will close and simultaneously, pressure valve 232 and conduit 228 will open allowing high pressure liquid to flow into generator 224 for its refill cycle of operation. As pressure valve 232 in conduit 228 is opened, simultaneously, water valve 272 is turned to the hot water position thus effecting the hot gas pressure generating cycle in generator 226. Also, water valve 270 is opened to its cold water position to cool generator 224 for its maximum refill capacity thus the cycle continues alternately maintaining a constant condensing cycle and producing refrigeration for whatever purpose desired.

The heat exchanger 256 serves a dual purpose. It precools the water for the generator refill cycle as well as raises the gas temperature from the evaporator before its entry into the injector valve 248. The hot water tank may be a standard twenty gallon hot water heater connected to the solar heater 280 and thermostatically controlled for supplying hot water during periods of insufficient sunshine for solar operation. However, due to the small demand of either hot or cold water to accomplish the pressure rise in the gas generator, even full time use of electric, gas or oil hot water would be negligible when compared to the operating costs of conventional refrigeration units. The tanks 234 are preferably stainless steel and are actually tanks within a tank in that the jackets 236 are also in the form of tanks. The outer tank or jacket provides a space for circulation of hot or cold water for raising or lowering the gas temperature for discharge or refill cycling of the generators.

The direct and indirect systems illustrated in FIGURES 1 and 9 are quite similar and the basic difference lies in the method of heating the motive gas in the generator. For extreme tropical locations and high temperature areas, either system will operate effectively. However, the indirect system offers residual hot water that has been solar heated and will carry the operation into periods in which the sun is insufficient to supply adequate hot water without the aid of electrical boosters. With the present system, normally wasted heat can be effectively utilized, for example, in industrial plants or in many other installations, normally wasted exhausted heat from various furnaces, boilers or power equipment could be effectively utilized to operate the refrigeration system thus saving an operating cost by utilizing normally wasted heat. Also, the initial cost of the present system is considerably less than the initial cost of corresponding conventional compression condensing systems having an equivalent capacity. Thus, there would be considerable saving in the initial cost and also in the subsequent operating or maintenance cost.

The gas ejector valve 40 or 248 actually replaces the mechanical compressor that is employed in a conventional refrigeration system. Its rugged construction and lack of moving parts renders it quite efficient and trouble free.

The ejector valve 40 illustrated in FIGURES 7 and 8 and high pressure gas is supplied to the gas inlet 126 where it passes into the bonnet 124 and then enters a gas orifice and nozzle 130 and 132 where the high pressure gas reaches extremely high supersonic velocities somewhere between 3500 and 4500 feet per second depending on the gas pressure and as indicated, the stored energy in the gas is converted into kinetic energy. The high velocity gas jet entrains refrigerant vapor into the inlet port 138 thus mixing the two streams and exchanging momentum in the diffuser area 120. The mixed stream falling at supersonic velocities is converted into pressure by means of another diffuser consisting of the diffuser throat section 112 and a diverging section 118 and a discharge section 114. Because of the high velocities involved, the gas ejector valve 40 will handle very large volumes of gas in relatively small units. Since the units have no moving parts and thus no mechanical friction, they are simple, reliable and inexpensive.

The specific construction and relationship of the components of the ejector valve may be varied depending upon the various conditions to be encountered. The location of the nozzle and the orientation and size relationships and slope characteristics of the various sections of the flow passage may be determined by any suitable procedures that are in accordance with proper design and construction of such a structure. The structure in FIGURES 10 and 11 shows a simplified design in which the nozzle or jet is adjustable with the structure illustrated in FIGURES 7 and 8 being a fixed dimensional valve.

The generators themselves are quite simple and any various design may be employed as long as its discharge and recovery rates will be compatible with the ejector valve. The louvers are simple to control and positive in action and may be controlled in any suitable manner.

The valve structures illustrated in FIGURES 7 and 10 of the drawings are interchangeable for use in either the direct or indirect system. Also, the adjustable jet nozzle illustrated in FIGURE 10 may also be incorporated into the valve structure illustrated in FIGURE 7. It is also pointed out that the juncture 44 actually constitutes part of the three-way high pressure control valve 56 since it acts as a juncture as well as a control point of liquid supply. Actually, the juncture 44 is on the base of the high pressure three-way control valve 66 and may be an integral part thereof.

The present principle of refrigeration may be employed in air conditioning systems, such air conditioning systems being especially useful in conjunction with marine structures, railroads, aircrafts, submarines, spacecraft and in space suits or the like. Also, as pointed out, other sources of energy may be employed where electrical energy is not available for operating the unit.

Various suitable controls may be provided for operating the unit in an efficient manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A refrigeration unit comprising an evaporator, an expansion valve on the inlet side of the evaporator, condenser means for cooling hot gaseous refrigerant and connected to said evaporator for supplying liquid refrigerant thereto, generator means connected to the supply of liquid refrigerant through expansion valve means, a gas ejector valve having an inlet connected to the generator means and an outlet connected to the condenser means, said generator means including a pair of generators, one of which is on an expansion cycle while the other is on a refill cycle, and means for heating the generator on the expansion cycle and cooling the generator on the refill cycle, said gas ejector valve having a suction area connected to said evaporator for reducing the pressure therein, each of said generators including solar heated means for supplying heat alternately thereto.

2. The structure as defined in claim 1 wherein said solar heated means includes a plurality of tubes exposed to the sun, and louvers for controlling the impingement of sun rays on the tubes for alternately heating the generators.

3. The refrigeration unit as defined in claim 2 wherein said solar heated means includes a water supply including a solar heat exchange unit for heating the supply of water, and means alternately supplying heated water or cooled water to the generators.

4. The structure as defined in claim 3 wherein a line connects the evaporator and the gas ejector valve and includes a heat exchanger for cooling water to be alternately discharged into one of the generators for cooling the generator on the refill cycle.

5. A refrigeration unit comprising an evaporator, an expansion valve on the inlet side of the evaporator, condenser means for cooling hot gaseous refrigerant and connected to said evaporator for supplying liquid refrigerant thereto, generator means connected to the supply of liquid refrigerant through expansion valve means, a gas ejector valve having an inlet connected to the generator means and an outlet connected to the condenser means, said generator means including a pair of generators, one of which is on an expansion cycle while the other is on a refill cycle, and means for heating the generator on the expansion cycle and cooling the generator on the refill cycle, said gas ejector valve having a suction area connected to said evaporator for reducing the pressure therein, said gas ejector valve including a body having a passage therethrough, a restricted throat in said passage defining said suction area, a nozzle having a discharge end disposed within the throat, the inlet of the nozzle being connected to the discharge of the generator means, a line extending from the evaporator to the body, said line communicated with the restricted throat whereby high pressure gas discharged through the throat will cause a vacuum within the line communicating with the evaporator thereby reducing the pressure therein.

6. The structure as defined in claim 5 wherein said nozzle is orientated adjustably in relation to the throat for varying the reduction in pressure in the evaporator and varying the volume of flow therethrough.

7. The structure as defined in claim 5 wherein said nozzle is mounted on an orifice plate, gauge means mounted in the ejector valve for determining the pressures therein.

8. A refrigeration unit comprising an evaporator, an expansion means on the inlet side of the evaporator, condenser means for cooling hot refrigerant gases and connected to the evaporator for supplying liquid refrigerant to the evaporator through the expansion means, generator means connected to the supply of liquid refrigerant, a gas ejector valve having an inlet communicating with the generator means and an outlet communicating with the condenser means, said generator means including a multiple of generators at least one of which is on an expansion cycle while the other is on a refill cycle, and means for heating the generator on the expansion cycle and cooling and the generator on the refill cycle, said gas ejection valve having a low pressure area connected to the discharge side of the evaporator for reducing the pressure therein.

9. A refrigeration unit comprising an evaporator having an expansion device on the inlet side thereof, a condenser, said condenser being connected to the expansion device on the inlet side of the evaporator for supplying liquid refrigerant thereto for expansion into the evaporator, said evaporator having a discharge line, a gas ejector having an outlet connected to said condenser, generating means connected to the inlet of said gas ejector, said gas ejector having a reduced pressure area connected to the discharge side of the evaporator for reducing pressure in the evaporator, said generating means supplying pressurized refrigerant gas to the inlet of the gas ejector, said generator means including at least a pair of generator units alternately in an expansion cycle and a refill cycle, means for alternately heating and cooling said generator units, said generator units including means connected to the condenser for receiving liquid refrigerant therefrom to serve as the cooling means for the generator unit being cooled, the suction area of the gas ejector also being communicated with the cooling means for the generating units for reducing the pressure therein whereby gases passing through the ejector will cause flow of refrigerant through the evaporator and cooling means for the generating means.

References Cited by the Examiner

UNITED STATES PATENTS

| 1,151,035 | 8/1915  | Norton          | 62—232 |
| 1,632,701 | 6/1927  | Gellenbeck et al. | 62—232 |
| 1,972,704 | 9/1934  | Crosthwait      | 62—116 |
| 1,972,704 | 9/1934  | Crosthwait      | 62—116 |
| 2,138,686 | 11/1938 | Altenkirch      | 62—2   |
| 2,931,190 | 4/1960  | Dubitzky        | 62—114 |

ROBERT A. O'LEARY, *Primary Examiner.*

W. E. WAYNER, *Assistant Examiner.*